Jan. 27, 1959 F. B. BARRETT 2,871,079
DISPENSERS FOR SANITARY SPOONS AND THE LIKE
Original Filed Sept. 7, 1954 3 Sheets-Sheet 1
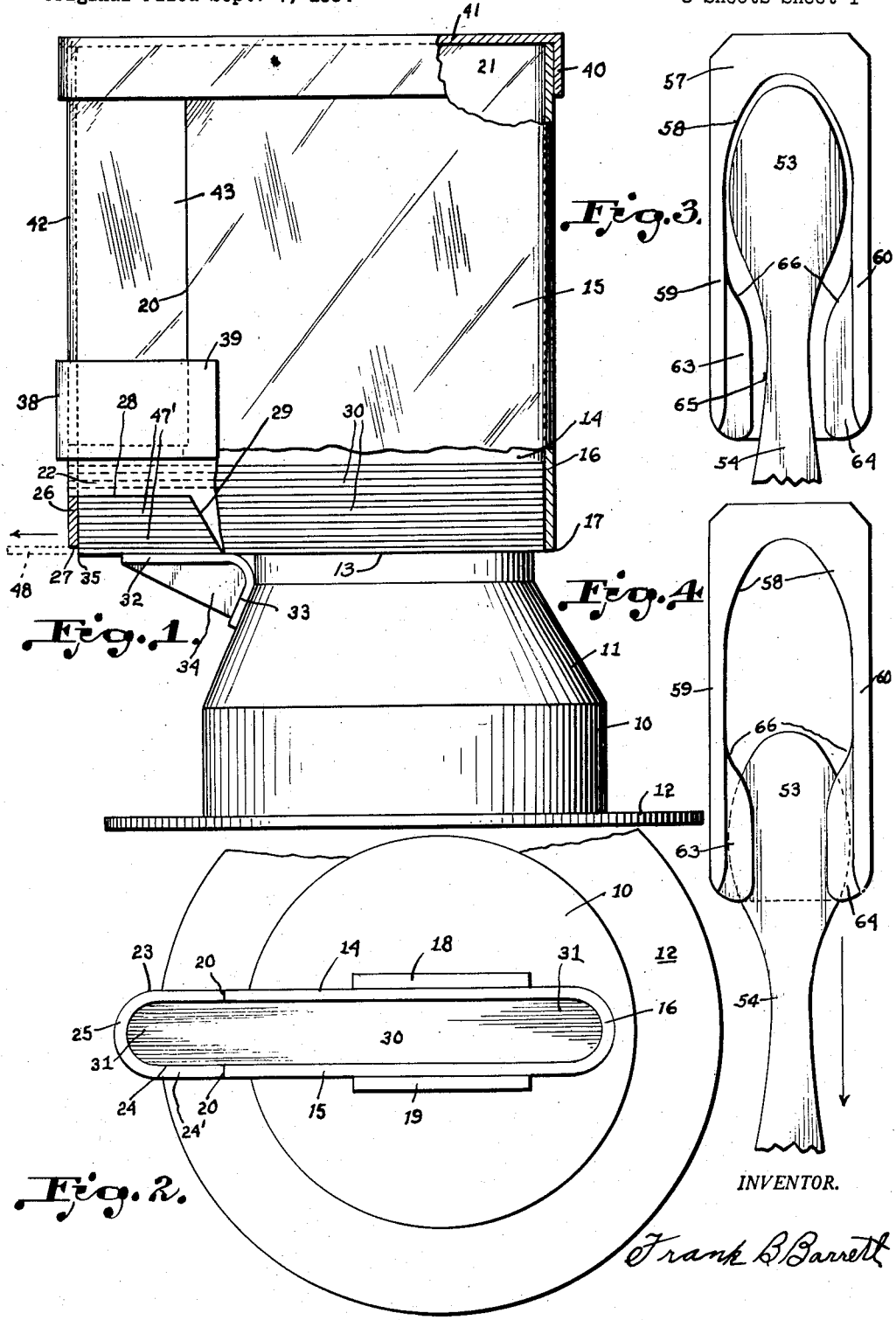
INVENTOR.
Frank B. Barrett

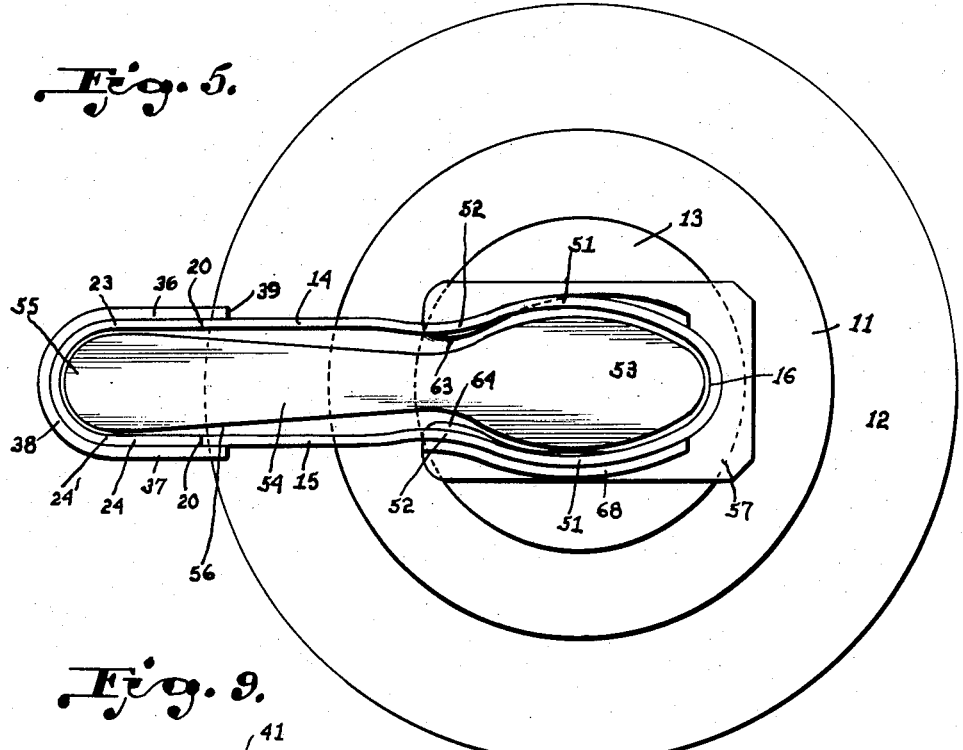
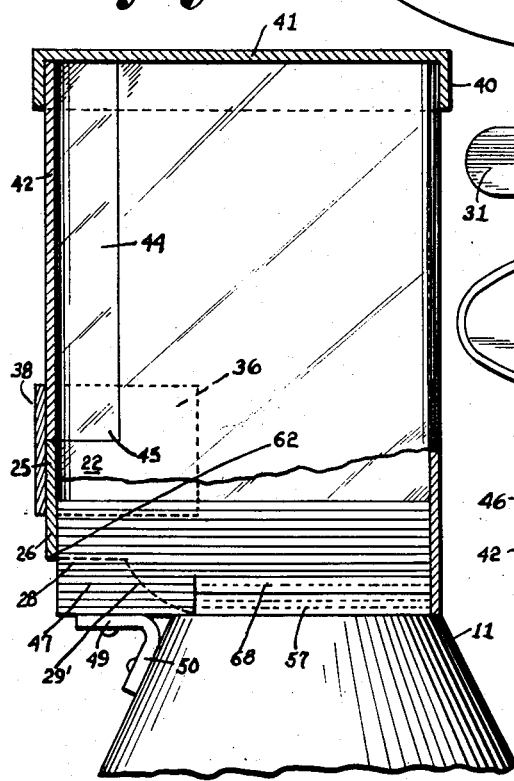
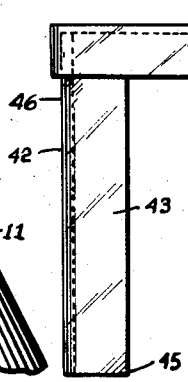
INVENTOR.
Frank B Barrett

Jan. 27, 1959 F. B. BARRETT 2,871,079
DISPENSERS FOR SANITARY SPOONS AND THE LIKE
Original Filed Sept. 7, 1954 3 Sheets-Sheet 3
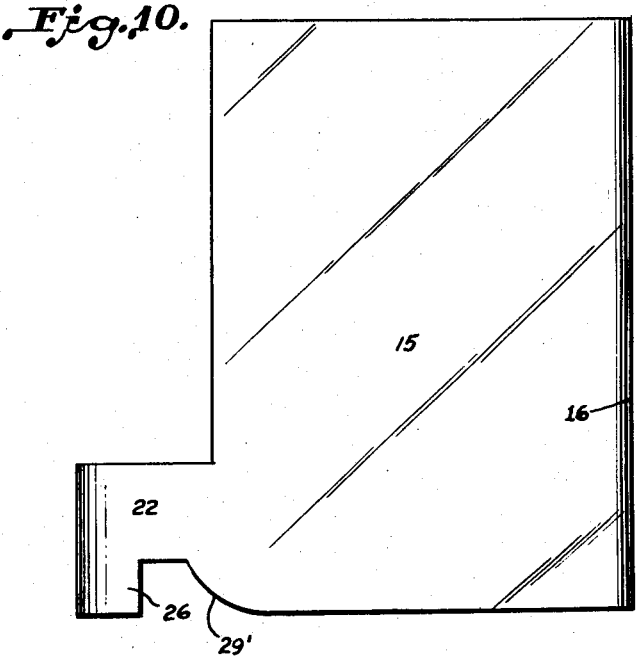
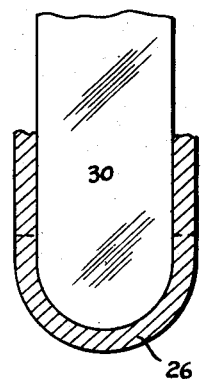
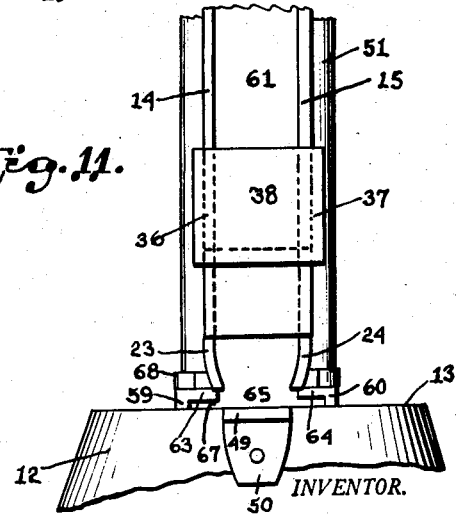
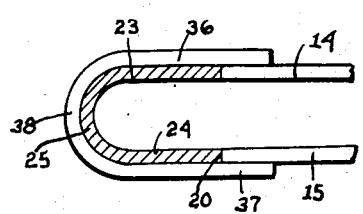
INVENTOR.
Frank B Barrett

United States Patent Office

2,871,079
Patented Jan. 27, 1959

2,871,079

DISPENSERS FOR SANITARY SPOONS AND THE LIKE

Frank B. Barrett, Henderson, Nev.

Continuation of application Serial No. 454,349, September 7, 1954. This application February 11, 1957, Serial No. 639,581

3 Claims. (Cl. 312—42)

This invention relates to improvements in dispensing apparatus and more particularly to a device for dispensing paddle-shaped or the like implements.

This application is a continuation of abandoned application 454,349, filed September 7, 1954.

My invention is designed to provide a sanitary form of dispenser. Such an apparatus is rendered necessary because of the nature of the article it delivers. Physicians, for example, employ wooden tongue blades for insertion into the mouth of a patient to hold down the tongue while he is inspecting membranes in the mouth. In certain restaurants flat thin elongated wooden implements are furnished to diners for the purpose of removing olives out of a container.

Promiscuous handling of these specially shaped implements results in tactual contamination often in respect to removal of these articles by persons able to take hold of them in a manner unguarded against unrestricted manipulation. Contact made by the hand with these implements under pressure may render them unfit for service by physicians and diners because of the hazard of spreading contagion. This is also the case where the implements are unduly exposed to dirt, dust and foreign particles.

It is the primary purpose of my invention to house or encase a stack of the mentioned implements in such a manner that the entire array is protected against ordinary harmful atmosphere influences as well as against a too free and easy manipulation of all parts of any implement removed from the dispenser. I accomplish this by means of certain parts arranged to guard against contact being made between hand and implement except edgewise thereof, and by assuring that only a single implement be ejected from the dispenser at any time.

In carrying out my invention I make provision for easily and quickly refilling the container or dispenser, due regard being bestowed upon the feature of enlarging the entranceway for the person engaged in restacking the implements in the container. The implements are snugly mounted in the container in closed position therein, in which condition the person restacking is handicapped because his hand would be cramped in the enclosure. Therefore I furnish a closure member for the container, which, when removed opens the container not only at its top but along its front so the restacking can take place under the same safeguards against tactual contamination for both in restacking and ejecting the hand is permitted freedom to grasp the implement at a point outside of the container. With the above and other objects in view my invention consists in the arrangement and details of construction set forth in the specification and then more particularly described in the appended claims.

In the drawings, wherein similar reference characters designate similar parts throughout the respective views, Figure 1 is a side elevation of one form of my invention, partly broken away and in section to reveal the interior of the lower part of the implement container, Figure 2 is a plan view of Figure 1, with the closure member removed therefrom, Figure 3 is a top plan view of a guard for qualifying the removal of specially shaped implements from a correspondingly shaped container, the latter not being shown, Figure 4 is a view similar to Figure 3 but showing the implement after it has been moved relatively to the guard, Figure 5 is a top plan view of the specially shaped modified container referred to in Figures 3 and 4, Figure 6 is a plan view of an implement adapted to be housed in the container shown in Figure 1, Figure 7 is a detail view in bottom plan showing the shape of the closure member, Figure 8 is a side elevation of my closure member, Figure 9 is an elevation, partly in section, to disclose the interior of the bottom of the container referred to in Figure 5, Figure 10 is a side elevation of the container of Figure 1 removed from its supporting pedestal, Figure 11 is a front fragmental view of Figure 9, Figure 12 is a fragmental section of my invention detailed to show a seat upon which the closure member is designed to be mounted, and Figure 13 is a cross-section of the lip of the implement container, at its lower front end.

Referring to the drawings which are merely illustrative of my invention, 10 is a circular pedestal or stand having at its bottom a circular flange 12. The stand has an upper horizontal flat surface 13 formed upon the upwardly tapering portion 11 of the stand. A housing or container for the implements about to be described comprises an upright, preferably transparent, U-shaped narrow shell, preferably constructed from plastic material, the opposite sides of which are vertically parallel, being designated 14, 15. The rear part of this shell curves around at 16 to join the side walls 14, 15.

The bottom edge of the shell is designated 17 and is open. The shell has its bottom horizontal edge 17 resting upon the upper horizontal flat surface 13 of the stand, centrally thereof, but so that the front part of the shell or housing projects forwardly of said stand. As a means of securing the housing upon the stand cleats or bars 18 and 19 fixed on the flat surface 13 of the stand contact the exterior surface of side walls 14 and 15 of the housing and may be cemented or otherwise affixed thereto.

The front end of the upright shell also curves around to join the sides 14, 15 thereof, being the portion or member 22 thereof whose opposite sides are designated 23, 24. The rear curved part of the shell 16 has its upper edge lying in the same plane as that of the upper edges of the sides, and its lower edge lying in the same plane as that of the lower edges of said sides, as shown in Figure 10. The front curved closed portion 22 of said shell, however, has its upper edge lying below the plane of the upper edges of the sides of said shell.

It will be observed that the lower part of the front closed curved end of the shell 22 is a portion 25 whose lower edge lies above the plane of the lower edges of the sides of the shell as at 26, a distance slightly greater than the thickness of one of said implements, to form a lip 27 for the purpose of serving as a guard and thus to confine all implements in said shell which may be enclosed by the closed end member 22, save a single implement. This arrangement will allow this single implement to be ejected or withdrawn under lip 27 when the finger of a user grasps hold of an implement through the recesses formed by the edges 28 and 29 of the sides of the shell, in conformity with the adjacent curvature of the closed shell end portion or member 22. This particular singly ejectable implement will always be the lowermost one of the stack, and it rests upon the horizontal upper flat surface 13 of the stand. The recess edge 29 may be inclined as at 29, or else made curvilinear as at 29' in Figure 9.

The shape of the implements intended to be encased in the container so far described is shown in Figure 6. It is an elongated narrow thin flat wooden piece 30 having rounded edges 31 at opposite ends. This type of implements is used in restaurants to pick up olives out of a dish or plate or special receptacle, and it may have other uses. In Figures 3, 4 and 5 is disclosed a form of implement in the nature of a tongue blade used by physicians for the purpose of examining the interior structure of the throat, etc. It is spatula-shaped, the main shank being designated 54 which may flare in one direction to provide a terminal 55, having a rounded end shape, and at the opposite end will provide a terminal 53 shaped like a spoon, also having a rounded end edge.

In this instance the housing or shell is modified in the particular that its inner portion is adapted to the configuration of the curvature of the spatula-shaped implement as at 51, Figure 5. It is now necessary to provide a different form of guard for confining all but the lowermost implement from being ejectable from the entire stack of such implements. This takes the form of a relatively thin guide member 57 which is secured intermediate the upper surface of the stand or pedestal support and said housing as shown in Figure 5. This guide member has a recess of U-shape in a horizontal plane, formed between the arms 59, 60 of the guide member and formed, and formed upon these arms are oppositely arranged flanges 63, 64 extending thus towards each other from opposite sides of the U-shaped recess 58. This guide member has provision for confining, one at a time, for ejection purposes a single implement of the shape just described, that is paddle-shaped, each implement being a relatively thin and flat preferably wooden or plastic body with an end of curved outline and width greater than that of the remaining part.

It will be observed from Figure 11 that the lower surfaces of the flanges 59, 60 of the guide member 57 lie in a plane which is spread above the upper surface of the pedestal or stand a distance less than twice the thickness of one of said paddle-shaped implements, which give rise to the narrow horizontal passageway 67 between guide member and pedestal top.

When now a stack of these paddle-shaped implements is placed in said device with the larger ends of the implements at the curved end of said housing 51, the lowest one of said implements will be in a plane below said flanges in said passageway 67. In this position it is free to be ejected from its container or housing thereout. But all the remaining implements in the housing will be confined interiorly thereof, while the one directly surmounting the lowermost one will be prevented from sliding out of said housing due to the presence of the flanges 63, 64 which form between themselves the restricted throat 65, that flares inwardly towards the center of the guide member as at 66. Figure 4 shows how the paddle implement, when lying below the flanges 63, 64 may be slid out of the passageway 65, but Figure 3 shows how the flaring throat 66 of this passageway will offer obstructions against which the paddle end 53 of the implement abuts when it is the one surmounting the lowermost implement, being thus arrested in movement out of said passageway. 47 designates the location of the recess formed by edges 28, 29 of the shell. From Figure 11 it will be observed that the front of the shell is open at 61 above and at 65 below the closed curved front end of the shell. It is also open at the top. The shell shown in Figure 9 is adapted to contain the paddle-shaped implement of Figures 3 and 4, and it has no lip such as is shown at 27 in Figure 1, so the lowermost edge 62 of the closed front end curve 26 of this shell forms a juncture with the edges 28 of the cut-away portion of the sides 14, 15 of the shell. There is an angle bracket or cleat interposed between the bottom of the container or shell and the stand 11. The horizontal flange thereof 49 forms a shelf extension which is flush with the upper flat portion 13 of the stand, while the angular portion 50 thereof is secured to stand 11. In ejecting an implement the latter slides on shelf 49 as an under support for the rear end of the implement when it moves in the plane of recess 47.

The vertical front edges of the side walls 14, 15 of the shell, as appears from Figure 12, are designated 20. The upper U-shaped edge of the front portion member 22 of the shell is designed 24', forming a seat for the bottom part of a closure member which will now be described.

Ordinarily where the implements are lodged in a container in bulk, any person may promiscuously remove one, usually holding it with fingers grasping the flat surface of the implement. Implements manipulated in this manner, but not removed, may leave traces of bacteria or other evidences of contamination. When inserted into the mouth of a person contagion may arise. My dispenser permits grasping the opposing edges 47' of the implement shown in Figure 6, for which the device of Figure 1 is adapted, where either curved end may interchangeably be inserted into a person's mouth. Ejecting the implement by pulling it out of the container, grasping it along its edges conduce towards conserving the use of the implement sanitarily. Where the form of implement of Figures 3, 4 and 5 is used, the part thereof which is grasped by the user for ejection purposes is the handle so that the paddle end is free from exposure and contamination.

The narrow interior of the shell, when closed, holds the stack of implements very snugly, but affords only a cramped enclosure for the hand of a user in properly inserting the implements into the shell, a condition that would or might result in the fingers contacting the walls of the shell interiorly. To avoid this drawback I resort to enlarging the area of open space by making it possible to take hold of the implements for inserting them into the container for restacking purposes therein exteriorly of the container. The said open end is outside the container where the user can take hold of the implement for ejecting it in the first instance.

When the stack of implements is encased in the container the major portions thereof are designed to be made longer than the extent of the shell from end to end so that a portion of each implement will project outside the open front 61 of the shell, that portion of the stack confronting the guard portion 22 of the shell extends therein while the implements of the remaining part of the stack below this guard portion are exposed outside the shell at their outer ends. I therefore provide a closure member shown in Figures 1, 7, 8 and 9. This device comprises a cap 41 of a shape to fit accurately around the perimeter of the top of the shell so as to close its top and inclose the upper edges of the sides of the shell as well as the upper edge of the rear closed curved portion 16 of the shell. This closure member has a depending member or part 42 having opposing flanges 43, 44 and a curved closed front 46 joining said flanges. The depending member 42 closes the open front 61 of the shell and has its lower U-shaped edge adapted to abut the upper U-shaped edge of the portion 22 of the shell, being thus seated thereupon. In order to confine this part of the closure member snugly I provide a horseshoe-shaped body whose sides 36, 37 are terminally attached to the side walls of the shell and abut the sides 23, 24 of the member 22. There is shown in Figure 12 in detail this arrangement. This horseshoe-shaped body extends snugly around the curved front of the member 22 along the upper edges of the latter, and projects for a distance above it as shown in Figures 1, 9 and 11, the curved part of the body embracing the curved part of member 22. This horseshoe-shaped body provides a convenient socket adapted to receive, confine and center the U-shaped depending part 42 of the closure member at its lower end as shown in Figure 1.

The closure member is applied by pressing its cap 41 down tight over the open top of the shell so the flanges 40 thereof embrace and enclose the parallel sides of said shell as well as the rear curved part thereof. Before the cap 41 comes into position to engage the shell the lower portion 45 of the depending part 42 of the closure member enters the socket of the horseshoe-shaped body, and, just as the lower edges of this closure member's front cover depending part become seated upon the upper edges of member 22, the cap closes the upper open end of the container and the part 42 of the closure member closes the open front of the shell.

The user on removing the closure member can hold the implements he inserts into the top of the shell to fill it by grasping the handle 47' of Figure 1 or Figure 9, as the case may be, where it projects outside the shell above member 22, and with slight pressure force it down towards its bottom. With all parts closed, the user, wishing to withdraw an implement takes hold edgewise of the lowermost one which rests upon shelf 32 of bracket 34 and on the flat top horizontal surface 13 of the stand 10. Its forward edge encounters no obstacle, being below and free from lip 27 of the container so he can extract the implement readily as at 48 (Figure 1), whereupon another implement will occupy the space vacated by the implement withdrawn.

I do not intend to confine myself to the exact details of construction herein disclosed but cover all variations falling within the purview of the appended claims.

This application is a continuation of Serial No. 454,349, filed September 7, 1954, entitled, "Dispensers for Sanitary Spoons and the Like," now abandoned.

What I claim and seek by Letters Patent is:

1. A dispenser as described consisting of a pedestal support having a horizontal flat upper surface, a housing comprising a vertical wall of U-shaped construction in cross-section in a horizontal plane, and a relatively thin guide member secured intermediate said upper surface of said pedestal support and said housing, and having a recess of U-shape in a horizontal plane, said guide member being formed with flanges extending toward each other from the opposite sides of said U-shaped recess, said guide member being adapted to receive in the space thereof one of a stack of paddle-shaped implements each of which is relatively thin and flat and provided with an end of curved outline and width greater than that of the remainder, the lower surfaces of said flanges lying in a plane which is spaced above the said pedestal upper surface less than twice the thickness of one of said paddle-shaped implements, so that when a stack of said implements is placed on said dispenser, with the wider ends of said implements at the curved end of said housing, the lowest one of said implements will lie in a plane below said flanges, and said implement withdrawn through said passage comprising said flanges, and the implement which lies immediately on the lowest will be prevented from being ejected when the lowest one is ejected.

2. A dispenser for holding a stack of thin and flat implements comprising a stand having a horizontal flat upper surface, a shell having its surface extending vertically and comprising spaced apart sides and closed curved ends, one of said closed curved ends having its upper edge lying in the same plane as that of the upper edges of said sides and its lower edge lying in the same plane as that of the lower edges of said sides, the other of said closed curved ends having its upper edge lying below the plane of the upper edges of said sides, and having its lower edge provided with portions forming recesses with the adjacent sides of said shell, said other closed curved end having a portion whose lower edge lies above the plane of the lower edges of said shell sides a distance slightly greater than the thickness of one of said implements to form a lip so as to permit the withdrawal of a single implement under said lip when the fingers of the user seize an implement through said recesses, and a closure member having an upper portion adapted to enclose the upper edges of said sides and the upper edge of said first-named closed end and having a depending member having edges adapted to abut the other of said closed curved ends and to abut the portions of said shell sides adjacent to the other curved end.

3. A dispenser for the purpose set forth which comprises a stand tapering upwardly to form a horizontal top, a container for tongue blades having vertically spaced sides, a closed back and open bottom, the lower edges of the side walls of said container resting upon an intermediate part of the top of said stand but so that the front plane of the container extends vertically forwardly of said stand top, means holding said container in attached relation upon said stand, a cleat secured with an angular side disposed flush with the stand top, as a forward extension thereof, and so as to close the adjacent open bottom of the container, whereby a stack of tongue blades housed in said container may rest upon the stand top and horizontal top of said cleat, the side walls of said container directly above said cleat being cut away to provide a recess for exposing those parts of the side edges of these tongue blades therein which rest upon said cleat whereby the opposing edges of said blade portions are exposed so as to be manually grasped, a vertical front wall carried by said container extending vertically downwardly into said recess to a point spaced away from said cleat horizontal top a distance equal to the thickness of one tongue blade to thereby free the lowermost of said housed tongue blades for movement over said cleat under said front wall of the container and out of the latter when manually grasped for that purpose.

References Cited in the file of this patent

UNITED STATES PATENTS

| | | |
|---|---|---|
| 1,980,819 | Nelson | Nov. 13, 1934 |
| 2,096,144 | Swart | Oct. 19, 1937 |
| 2,110,189 | Zeidler, Sr. | Mar. 8, 1938 |
| 2,551,425 | Drexel | May 1, 1951 |

FOREIGN PATENTS

| | | |
|---|---|---|
| 438,000 | Great Britain | Nov. 8, 1935 |